(12) United States Patent
Craig, Jr.

(10) Patent No.: US 6,463,632 B2
(45) Date of Patent: Oct. 15, 2002

(54) GUIDE ARRANGEMENT FOR TIGHTENING TOOL EMPLACEMENT IN HOSE CLAMPS PROVIDED WITH PLASTICALLY DEFORMABLE EARS

(75) Inventor: Paul M. Craig, Jr., Silver Spring, MD (US)

(73) Assignee: Hans Oetiker AG Maschinen-und Apparatefabrik, Horgen (CH)

( * ) Notice: Subject to any disclaimer, the term of this patent is extended or adjusted under 35 U.S.C. 154(b) by 0 days.

(21) Appl. No.: 10/026,716

(22) Filed: Dec. 27, 2001

(65) Prior Publication Data

US 2002/0104198 A1 Aug. 8, 2002

Related U.S. Application Data

(60) Provisional application No. 60/266,884, filed on Feb. 7, 2001.

(51) Int. Cl.$^7$ ................................................. F16L 33/22
(52) U.S. Cl. ...................................................... 24/24
(58) Field of Search .............................. 24/20 R, 23 W, 24/20 CW, 20 TT, 20 W; 81/9.3; 140/150, 93.4; 29/450, 268, 280; 72/409.01

(56) References Cited

U.S. PATENT DOCUMENTS

| | | | | |
|---|---|---|---|---|
| 4,222,155 A | * | 9/1980 | Oetiker |
| 4,312,101 A | * | 1/1982 | Oetiker |
| 4,430,775 A | * | 2/1984 | Arthur |
| 4,724,583 A | * | 2/1988 | Ojima |
| 4,724,729 A | * | 2/1988 | Oetiker |
| 5,669,113 A | * | 9/1997 | Fay |

FOREIGN PATENT DOCUMENTS

JP  9-126372  * 5/1997

* cited by examiner

Primary Examiner—James R. Brittain
(74) Attorney, Agent, or Firm—Paul M. Craig, Jr.

(57) ABSTRACT

A guide arrangement for minimizing incorrect emplacement of a tightening tool at a plastically deformable ear of a hose clamp which includes male guide profiles in the clamp adapted to cooperate with female guide profiles in the tightening tool to permit the installer to sense proper positioning of the tightening tool when the male guide profiles are in engagement with the female guide profiles in the tightening tool.

29 Claims, 3 Drawing Sheets

GUIDE ARRANGEMENT FOR TIGHTENING TOOL EMPLACEMENT IN HOSE CLAMPS PROVIDED WITH PLASTICALLY DEFORMABLE EARS

This application discloses and claims subject matter disclosed in my then-pending Provisional Application Ser. No. 60/266,884, filed in the U.S. Patent and Trademark Office on Feb. 7, 2001, and entitled "Guide Arrangement For Tightening tool Emplacement in Hose Clamps Provided with Plastically Deformable Ears," now abandoned, and I hereby claim the right of priority of such provisional application.

FIELD OF THE INVENTION

This invention relates to a guide arrangement for minimizing the likelihood of an improper application of a pincer-like tightening tool for the plastic deformation of hose clamps provided with so-called "Oetiker" ears.

BACKGROUND OF THE INVENTION

Hose clamps with plastically deformable ears, so-called "Oetiker" ears, which have been sold by the hundreds of millions, have enjoyed an immense commercial success. They are widely used, for example, on the assembly line of the automotive industry to tighten hoses onto nipples by the plastic deformation of the ear. Though infrequently, an improper positioning of the pincer-like tightening tools which on the assembly line are usually pneumatically operated, may cause an incorrect deformation of the ear. This, in turn, requires that the piece with the incorrectly deformed ear has to be taken out of the assembly line, the incorrectly installed clamp then has to be removed, and a new clamp has to be installed and tightened before the work piece can be re-entered on the assembly line. Because of time requirements and extra work, this is an annoyance which is to be avoided as far as possible.

BACKGROUND OF THE INVENTION

The principal object of the present invention is to minimize the incorrect application of the tightening tool in hose clamps provided with plastically deformable ears. According to this invention, this is achieved by providing complementary guide profiles in the clamp and in the tightening tool so that the installer at the assembly line can interactively determine the correct application of the tightening tool when he or she senses mutual engagement of the guide profiles.

In one embodiment of the present invention involving so-called closed or endless clamps, guide surfaces are provided in the clamping ring by deep-drawn ridge-like embossments or projections forming male guide profiles extending outwardly within the areas of the connection of the clamping ring with the leg portions of the plastically deformable ear. The end surfaces of the jaws of the tightening tool are then provided with complementary notch-like cutouts forming female profiles so that the installer can feel the proper position of the tightening tool relative to the clamp when the notch-like cutouts are in engagement with the ridge-like embossments or projections.

In a preferred embodiment of this invention, which applies to so-called open clamps, usually made from galvanized steel or stainless steel band material, advantage is taken of the existence of overlapping band portions that exist from the point of the mechanical connection to the free end of the inner band portion when the mechanical connection, usually in the form of one or more hooks extending outwardly from the inner band portion into openings in the outer band portion, is engaged but before the plastically deformable ear in the outer band portion is plastically deformed to tighten the clamp. A typical clamp of this type is disclosed in U.S. Pat. No. 4,299,012 to Hans Oetiker. Once the mechanical connection is engaged, the inner band portion 11$b$ will extend with its full width underneath the gap of the non-deformed ear. In a clamp of this type, the guide profiles are provided according to this invention in parts of the two mutually overlapping band portions as will be described more fully hereinafter. Again, correct application of the tightening tool can be interactively sensed by the installer when the mutually complementary guide profiles formed by deep-drawn outwardly extending embossments or projections in the inner band portion which, extending through narrow slots in the outer band portion, engage with the notch-like cut-outs in the jaw members of the tightening tool.

BRIEF DESCRIPTION OF THE DRAWINGS

These and other objects, features and advantages of the present invention will become more apparent from the following description when taken in conjunction with the accompanying drawing which shows, for purposes of illustration only, several embodiments in accordance with the present invention, and wherein.

DETAILED DESCRIPTION OF THE INVENTION

Figure 2:
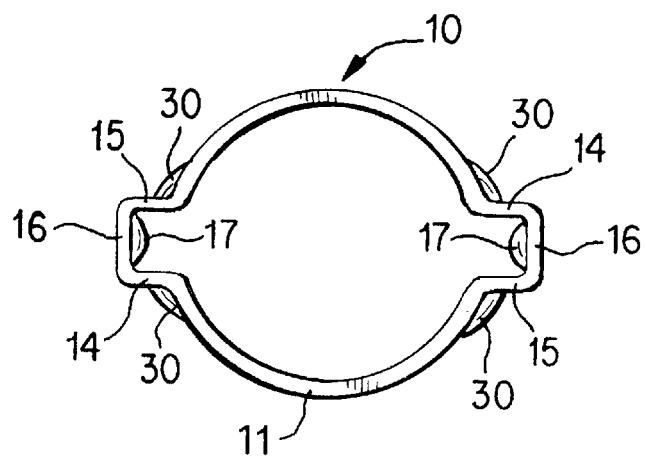
FIG. 2 is a side elevational view, similar to FIG. 1 and showing an endless two-ear clamp provided with deep-drawn male embossments or projections forming male guide profiles in accordance with this invention.
Figure 1:
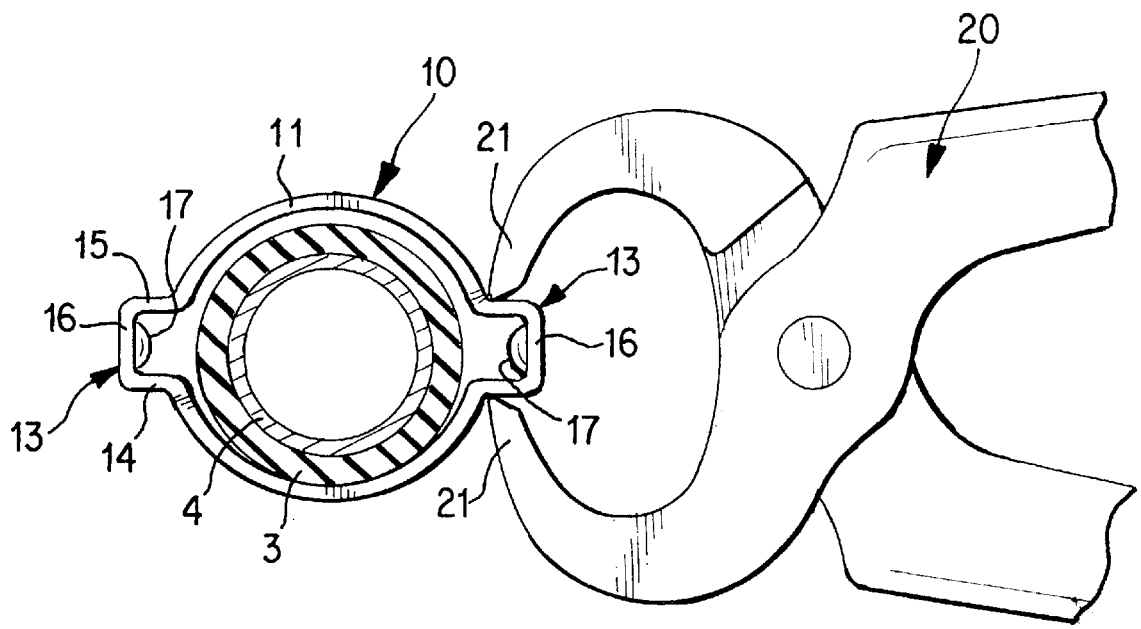
FIG. 1 is a somewhat schematic elevational view of a prior art hose clamp of the so-called closed or endless type, provided with two plastically deformable ears adapted to be plastically deformed by a pincer-like tightening tool to tighten, for example, a hose onto a nipple.
Figure 3:
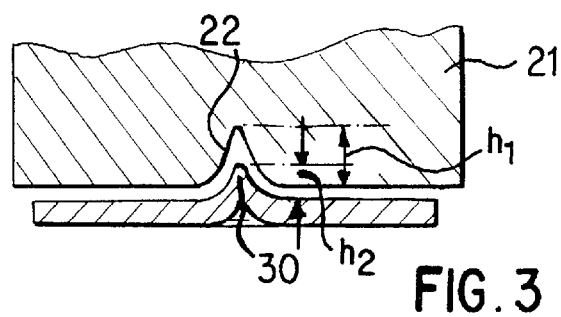
FIG. 3 is a somewhat schematic cross-sectional view, on an enlarged scale and showing the mutually complementary guide profiles in the clamp and in the tightening tool used in the embodiment of FIG. 2.

Referring now to the drawing, wherein like reference numerals are used throughout the various views to designate like parts, and more particularly to FIG. 1–3, the so-called closed or endless clamp generally designated by reference numeral 10 which is made from tubular stock realized by any known manufacturing method, includes two plastically deformed so-called "Oetiker" ears generally designated by reference numeral 13 which are disposed mutually opposite in the ring 11. Each plastically deformable ear 13 includes two outwardly extending leg portions 14 and 15 interconnected by a bridging portion 16, preferably provided with a reinforcement 17 of any known construction, for tightening the hose 3 onto a nipple 4 by plastic deformation of the ears with the assistance of a pincer-like tightening tool generally designated by reference numeral 20 and provided with jaw-like members adapted to engage in the area of the connection between the ring 11 and the outwardly extending leg portions 14 and 15, as known in the art.

To minimize improper application of the tightening tool 20, the clamp 10 according to the present invention (FIG. 2) is provided with ridge-like, deep-drawn projections or embossments 30 of more or less conical shape forming male guide profiles and schematically shown in FIGS. 2 and 3 which can be realized by deep-drawing. The jaw-like members 21, in turn, are provided with complementary notch-like cutouts 22 forming female guide profiles whereby the depth h1 (FIG. 3) of the cutouts 22 is greater than the projecting height h2 of the projecting male guide profiles 30 in order to avoid a wedging action that might occur when compressive forces are applied to the tip of the projection or embossment 30 during application of the jaw members 21 in the course of tightening of the ear.

Figure 4:
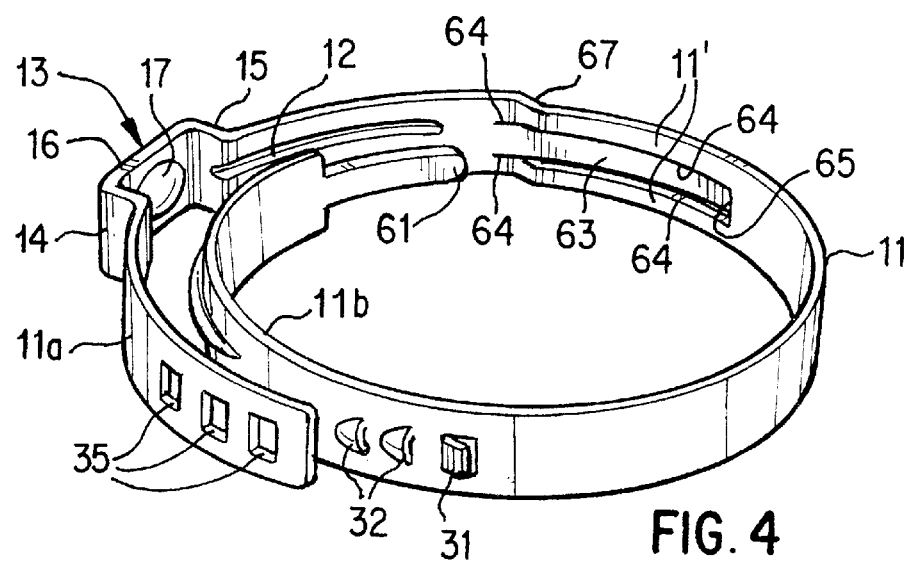
FIG. 4 is a somewhat schematic perspective view of a so-called open clamp with a guide arrangement in accordance with the present invention.
Figure 5:
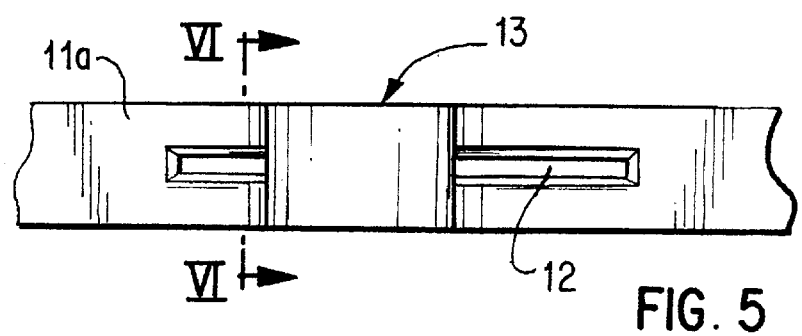
FIG. 5 is a partial plan view on the outer band portion of FIG. 4, with the parts thereof in the plane of the drawing for the sake of better understanding.
Figure 6:
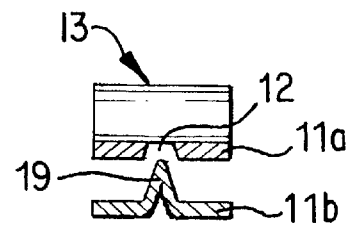
FIG. 6 is a cross-sectional view taken along line VI—VI of FIG. 5.
Figure 7:
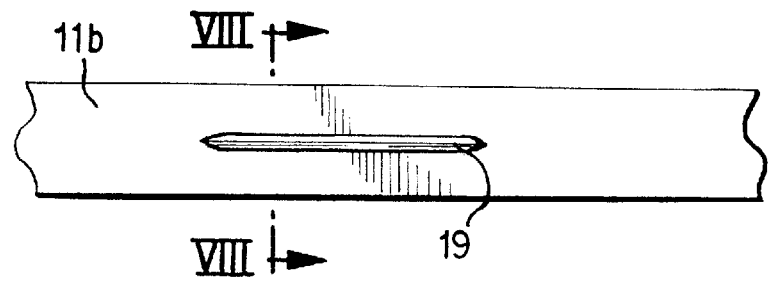
FIG. 7 is a partial plan view on the inner band portion of FIG. 4, again with the parts thereof in the plane of the drawing for the sake of better understanding.
Figure 8:
FIG. 8 is a cross-sectional view taken along line VIII—VIII of FIG. 7.

Though the arrangement of the guide profiles of FIGS. 2 and 3 are quite feasible, they may entail certain disadvantages as a result of the strengthening of the clamp material by the pressed-out male guide projections 30 in the areas of the connections between the clamping ring and the leg portions 14 and 15, possibly also affecting the force requirements to plastically deform the ear and the elastic breathing capabilities of the clamp. These disadvantages are avoided in the preferred embodiment of this invention illustrated in FIGS. 4 through 8. FIG. 4 thereby illustrates a typical open clamp made from band material as illustrated in FIG. 19 of U.S. Pat. No. 4,299,012 to Hans Oetiker and as more fully described therein. The clamp of FIG. 4 again includes a clamping band 11 as well as a so-called "Oetiker" ear generally designated by reference numeral 13 that consists of outwardly extending leg portions 14 and 15 interconnected by a bridging portion 16 provided with a reinforcing groove or depression 17. The mechanical connection may include in this type of clamp a so-called guide hook 31 and two cold-deformed deep-drawn support hooks 32 adapted to engage in openings 35. To assure an inner clamping surface devoid of steps or gaps, the inner clamping band portion 11b has a tongue-like extension 61 adapted to extend through an opening in the step-like portion 67 formed in the outer clamping band portion 11a. When the mechanical connection 31, 32 is engaged in apertures 35 and before the ear 13 is plastically deformed, the inner band portion 11b extends with its full band width underneath the ear to bridge the gap. According to the present invention, the inner band portion 11b is provided with a male guide profile 19 in the form of a deep-drawn ridge-like projection or embossment adapted to extend through slot-like openings 12 in outer band portion 11a on both sides of the leg portions 14 and 15. The inner ends of the leg portions 14 and 15 are also provided with small cutouts complementary to the male guide profile 19, whereby the male guide profile 19 preferably extends in the inner band portion continuously from the left beginning thereof in FIG. 4 to the right end. As the inner band portion 11b is fixed relative to the outer band portion 11a by the mechanical connection 31, 32, 35, the male guide profile 19 and the slot-like opening 12 only need to extend a short distance to the left of the leg portion 14 of the ear. On the other hand, the slot-like opening 12 to the right of leg portion 15 has to be of sufficient length to permit the male guide profile 19 to slide therethrough until the deformation of the ear reaches its maximum, i.e., the inner ends of the leg portions 14 and come into contact with one another.

The jaw-like members of the tightening tool (not shown in FIGS. 4–8) are again provided with female guide profiles formed by notch-like cutouts of complementary shape as disclosed in connection with FIG. 3, bearing in mind what was said as regards the dimensions in the embodiment of FIGS. 2 and 3.

Figure 9:
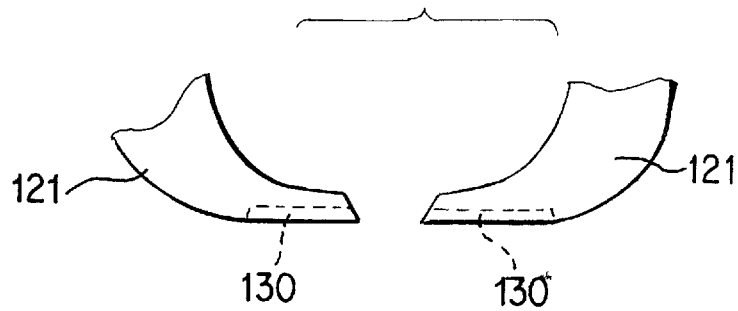
FIG. 9 is a somewhat schematic elevational view of a tightening tool with modified jaw members for use in connection with the present invention.

FIG. 9 illustrates the application of the present invention to a clamp which utilizes a tightening tool with modified jaw-like members 121 having a substantially flat bottom portion as schematically shown in FIG. 9. The substantially flat bottom portions of the jaw-like members 121 are then provided with notch-like cutouts 130 at the underside thereof which are shaped to engage with the male guide profiles as disclosed in connection with the other embodiments illustrated herein. With a tightening tool of FIG. 9, the male guide profiles may be somewhat extended in length, which in case of the embodiment of FIGS. 4 through 8 will also require a lengthening of the slot-like openings. The jaw-like members 12 of FIG. 9 may be modified to suit the requirements of any particular application whereby, for example, the length of the more or less flat bottom portion may be adapted to particular clamp sizes, for instance, by the use of interchangeable jaw members adapted to be selectively installed in pneumatic or hydraulic tightening tools.

Figure 10:
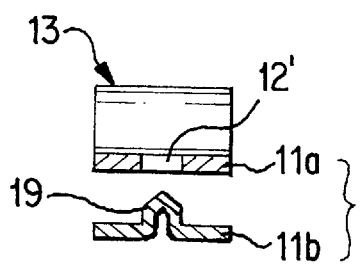
FIG. 10 is a somewhat schematic cross-sectional view, similar to FIG. 6, of a modified embodiment of this invention with rectilinear openings 12'.
Figure 11:
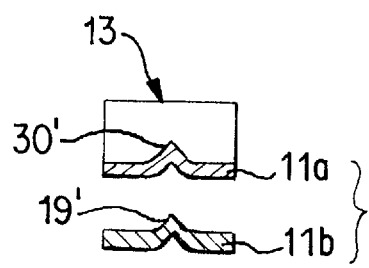
FIG. 11 is a somewhat schematic cross-sectional view, similar to FIGS. 6 and 10 of a still further modified embodiment of this invention with male guide profiles in both the inner and outer clamping band portions.

While I have shown and described several embodiments in accordance with the present invention, it is understood that the same is not limited to the details shown and described herein but is susceptible of numerous changes and modifications a known to those skilled in the art. For example, the particular shape and dimensions of the male and female guide parts may be modified to adapt to particular conditions of the band material and/or tightening tools. The slot-like openings 12 may also be straight in cross section (FIG. 10) instead of converging in the upward direction (FIG. 6) in which case the male guide profiles may have a rectilinear portion terminating in a suitably tapering profile with the notch-like cutouts of complementary shape. Furthermore, the overlapping outer band portion 11a alone may also be provided with male profiles 30' (FIG. 11) in lieu of openings 12 and in lieu of the guide profile 19 in the inner clamping band portion. However, in that case, there will be no lateral guidance between the inner and outer band portions 11b and 11a which would preclude the inner band portion 11b from sliding laterally relative to the outer band portion 11a, especially in the area of overlap. To remedy this shortcoming, the inner band portion 11b may then also be provided with a male profile 19' of a shape complementary to the internal contours of the male profile 30' so that mutual lateral guidance can then be achieved by engagement of the male guide profile 19' of the inner clamping band portion 11b from below into the pressed-out male guide profile of the outer clamping band portion 11a.

An additional advantage of the male guide profiles in accordance with this invention resides in the automation possibility with the use of these guide profiles in the clamps to adjust a robot arm carrying the tightening tool by an optical imaging device of conventional construction optically determining coincidence with or deviation of the male guide profile from a predetermined position with a matrix whereby the male profile can also be made more visible by any conventional means such as appropriate lighting and/or painting. The adjustment of the position of the robot arm can be realized by electromechanical, electropneumatic or electrohydraulic means of any conventional type so as to eliminate any non-coincidence of the line formed by the male guide profile with a predetermined line in the matrix, as is conventional with such types of automatic positioning devices.

Thus, the present invention is capable of numerous modifications as known to those skilled in the art, and I therefore do not wish to be limited to the details shown and described herein but intend to cover all such changes and modifications as are encompassed by the scope of the appended claims.

What is claimed is:

1. A hose clamp, comprising clamping band means, a tightening device in said clamping band means in the form of a plastically deformable ear including outwardly extending leg portions interconnected by a bridging portion, and an arrangement to assure proper application of a tightening tool in the area of each connection between said clamping band means and said leg portions.

2. A hose clamp according to claim 1, wherein said arrangement includes guide profile means in said area which are of predetermined cross section recognizable by a tightening tool provided with complementary guide profile means.

3. A hose clamp according to claim 2, wherein said guide profile means are located in the center area of the clamping band means.

4. A hose clamp according to claim 2, wherein said guide profile means are cold-deformed, deep-drawn parts extending generally in the longitudinal direction of the clamping band means within each of said areas.

5. A hose clamp according to claim 4, wherein each deep-drawn part is in the form of an embossment.

6. A hose clamp according to claim 5, wherein said embossment is of approximately V-shape.

7. A hose clamp according to claim 2, wherein said guide profile means are formed directly in the clamping band means in the areas of the connection thereof to said leg portions.

8. A hose clamp of the open type according to claim 2, wherein said clamping band means has a clamping band portion intended to form an outer clamping band portion which includes the plastically deformable ear and a clamping band portion intended to form an inner clamping band portion adapted to be overlapped by said outer clamping band portion, and wherein the guide profile means include outwardly extending, pressed-out deep-drawn parts in at least one of the inner and outer clamping band portions extending generally in the longitudinal direction of the clamping band means.

9. A hose clamp according to claim 8, wherein the deep-drawn parts are provided in the inner clamping band portion.

10. A hose clamp according to claim 9, wherein said deep-drawn parts extend through slot-like openings in said outer clamping band portion.

11. A hose clamp according to claim 10, wherein the slot-like opening in the outer clamping band portion on the side of the leg portion opposite the free end of the outer clamping band portion has a length sufficient for the deep-drawn part to extend therethrough during plastic deformation of the ear to the maximum plastic deformation thereof.

12. A hose clamp according to claim 8, wherein said deep-drawn parts are provided only in the outer clamping band portion.

13. A hose clamp according to claim 8, wherein said deep-drawn parts are provided in both said inner and outer clamping band portions and are of such complementary shape that deep-drawn parts of the inner clamping band portion can extend from below into the deep-drawn parts of the outer clamping band portion.

14. A hose clamp according to claim 8, wherein said pressed-out parts are of at least part approximately V-shape in cross section.

15. An arrangement for assuring the proper application of a tightening tool having jaw-like members operable to engage in the areas of the connections of two leg portions of a plastically deformable ear with a clamping band means of a hose clamp, comprising guide means in said jaw-like members and in said areas of connections to indicate proper position of the tightening tool, said guide means including guide profile means in the jaw-like members and in the areas of the connections of said clamping band means with said leg portions, and said guide profile means being of substantially complementary shape.

16. An arrangement according to claim 15, wherein said guide profile means are of substantially complementary male and female shape to indicate proper position of said jaw-like members relative to said plastically deformable ear when said guide profile means are mutually aligned.

17. An arrangement according to claim 15, wherein the guide profile means in the clamping band means within the areas of said connections are located in the center area of the clamping band means.

18. An arrangement according to claim 15, wherein the guide profile means in the tightening tool are located in the end areas of the jaw-like members.

19. An arrangement according to claim 15, wherein said guide profile means are located directly in the parts of the clamping band means connected to the leg portions.

20. An arrangement according to claim 15, wherein said clamping band means has a clamping band portion intended to form an outer clamping band portion which includes the plastically deformable ear and a clamping band portion intended to form an inner clamping band portion adapted to be overlapped by said outer clamping band portion and operable to bridge the gap underneath the ear, and wherein said guide profile means extend outwardly of said outer clamping band portion.

21. An arrangement according to claim 20, wherein said guide profile means are formed in the inner clamping band portion and extend through slot-like openings in the outer clamping band portion within said areas.

22. An arrangement according to claim 20, wherein at least some of said guide profile means are provided in the outer clamping band portion.

23. An arrangement according to claim 22, wherein some of said guide profile means are also provided in the inner clamping band portion and are of such complementary shape that they can extend into the guide profile means of the outer clamping band portion from below.

24. An arrangement according to claim 15, wherein the male guide profile means in the hose clamp are ridge-like male parts projecting outwardly from the clamping band means and the guide profile means in the jaw-like members are notch-like female cutouts of substantially complementary shape to the male parts.

25. An arrangement according to claim 24, wherein said ridge-like parts and said notch-like parts are of approximately V-shaped cross section of different dimension as to height and depth thereof, respectively.

26. A guide arrangement for minimizing incorrect emplacement of a tightening tool at a plastically deformable ear of a clamp, comprising male guide profiles in the clamp adapted to cooperate with female guide profiles in the tightening tool to determine proper positioning of the tightening tool when the male guide profiles of the clamp are in engagement with the female guide profiles in the tightening tool.

27. A guide arrangement according to claim 26, wherein proper positioning of the tightening tool relative to the ear is adapted to be determined interactively by the installer.

28. A guide arrangement according to claim 26, wherein proper positioning of the tightening tool relative to the ear is determined by optical means comparing the position of the male guide profiles with a predetermined position of the tightening tool.

29. A guide arrangement according to claim 26, wherein the tightening tool is fixedly mounted on a robotic arm having optical means determining actual position of the male guide profiles, means comparing the actual position of the male guide profiles with a correct position of the robotic arm, and means for adjusting the robotic arm to achieve coincidence of the actual position with said correct position.

* * * * *